United States Patent
Nappe

[15] 3,675,933
[45] July 11, 1972

[54] SEAL WITH INSTALLED SPACE PARTS

[72] Inventor: William D. Nappe, Broomall, Pa.

[73] Assignee: Crane Packing Company, Morton Grove, Ill.

[22] Filed: Sept. 3, 1970

[21] Appl. No.: 69,352

[52] U.S. Cl..................................277/9, 277/38, 277/65, 285/16
[51] Int. Cl.......................................F16k 15/16
[58] Field of Search...............277/9, 65 X, 81, 38 X; 285/15, 285/16 X, 17

[56] References Cited

UNITED STATES PATENTS

| | | | |
|---|---|---|---|
| 2,945,709 | 7/1960 | Freed et al. | 277/9 X |
| 3,044,787 | 7/1962 | Derman | 277/83 |
| 3,147,981 | 9/1964 | Woerheide | 277/9 |
| 3,441,284 | 4/1969 | Murray et al. | 277/9 |

*Primary Examiner*—William E. Wayner
*Attorney*—Charles F. Voytech

[57] ABSTRACT

To avoid the necessity of disassembling a drive for a pump to replace worn or defective parts of an end face shaft seal, provision is made for assembling around the shaft replacement parts for the seal at the time the original installation of the shaft seal is made. The subsequently worn or defective parts of the seal are destroyed and removed and the stored replacement parts are moved axially into place in he seal. The gland plate is split and removable to allow the replacement parts to pass through the gland plate to the seal. Worn parts which cannot be destroyed are moved to an annular storage space in housing provided for this purpose.

4 Claims, 6 Drawing Figures

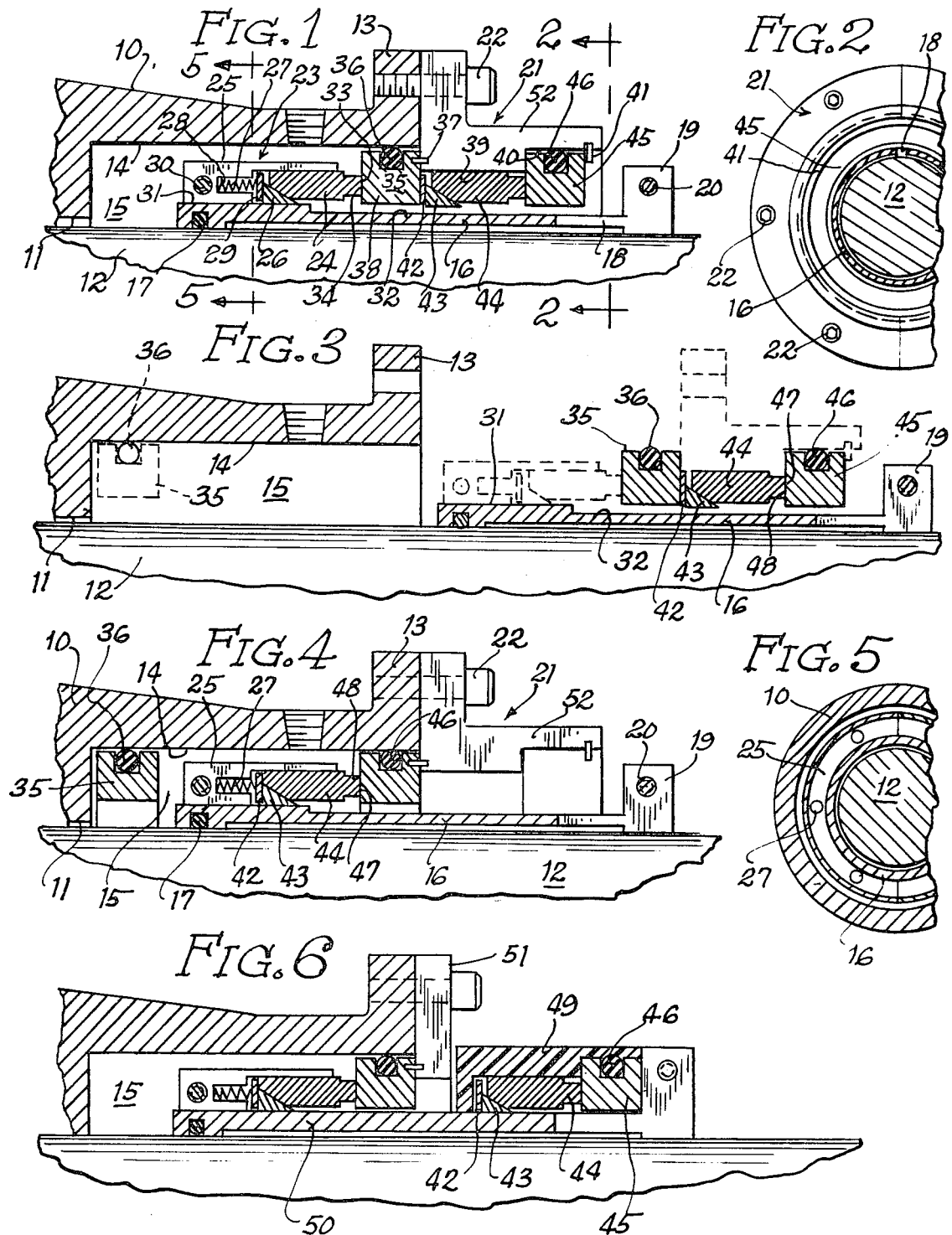

SEAL WITH INSTALLED SPACE PARTS

This invention relates to rotary mechanical seals of the end face type and particularly to a combination of such a seal with a housing and gland plate which permits storage of replacement parts for the seal at the time the seal is installed.

It is well known that pumps for fluids driven from the exterior require a seal in the pump housing around the pump drive shaft, the seal being disposed between the motor and pump. Modern speeds and pressures for pumps require the use of end face mechanical seals for this purpose. Such seals use rigid lapped washers and cooperating seats for the running seal, and endless ring type flexible secondary seals. When the washer, seat or secondary seal fails, the pump must be shut down and the drive disassembled from the shaft so that the defective part can be removed and the new part can be installed in its place.

The cost of replacing the defective seal parts is, of course, appreciable, but it may be small compared to the loss of production while the pump is down, and to the cost of the rejected fluid resulting from incorrect processing caused while the pump is shutting down. To reduce this cost, seal designers have resorted to split seals which theoretically can be moved and replaced without disassembling the drive for the pump, but such seals are costly and are adaptable mainly to large shafts such as are used on ships. In the smaller shaft sizes where split seals have not been practical, the use of two seals in tandem has been proposed, the second seal serving as a standby until needed, the first seal, though defective, being allowed to remain in place until an opportune time is presented to remove it. The tandem seal design has not been very successful, partly because the second or standby seal must be installed with its running faces slightly separated to prevent wear, but when separated, they are exposed to ambient dirt particles which may scar them and diminish or destroy their effectiveness.

The principal object of this invention is to provide means for replacing worn or defective parts of a rotary mechanical shaft seal with a minimum of down time and expense, and with maximum effectiveness of the replacement parts.

As a more specific object, this invention has within its purview the installation of replacement parts for seals around a shaft at the time of the original installation of an end face shaft seal around said shaft, with means for effecting the replacement of the seal parts without the disassembly of the drive for the shaft.

A further object of this invention is to provide an end face seal design and a design of the housing and gland plate associated with the seal which will permit the storage of spare washer, seat and secondary seal parts with complete protection of said spare parts while they are so stored.

These and other objects of this invention will become apparent from the following detailed description of a preferred form of the invention when taken together with the accompanying drawings in which:

FIG. 1 is an axial quarter section through an end face seal and spare parts therefor as installed in a housing;

FIG. 2 is an end view in section, on a reduced scale, of the seal and housing of FIG. 1, the section being taken along line 2—2 of FIG. 1;

FIG. 3 is a view in section of the seal and housing of FIG. 1 showing the seal and spare parts as they are being installed;

FIG. 4 is an axial quarter sectional view of the seal of FIG. 1 after the spare parts have been installed;

FIG. 5 is an end view in section, on a reduced scale, of the seal of FIG. 1, the section being taken along line 5—5 of FIG. 1; and FIG. 6 is an axial quarter section of a modification of the seal and spare parts of FIG. 1.

The present invention is more readily adaptable to end face seals which use a solid ring-type secondary seal, and the seal selected to illustrate this invention is therefore one which uses a wedge-shaped secondary seal made from polytetrafluoroethylene. A rigid seat is used for the seal, the seat being either metal or ceramic and having a lapped face of a sealing washer made of a different material. The washer is driven by an axially split retainer secured to a sleeve clamped or pressed on the pump shaft. The seal cavity in the pump housing is longer than required by the seal so that storage space can be provided for the seat after it has become worn and is discarded.

The gland plate for the housing is split axially and has a hub-like axial extension defining a second seal cavity in which are retained as spare parts a sealing washer, a secondary seal for the sealing washer, a seat and a secondary seal for the seat.

To replace the worn seat, sealing washer and secondary seal in accordance with this invention, the split gland plate is removed, the sleeve and seal parts thereon are pulled out, the split retainer is removed to gain access to the wedge-shaped secondary seal which is cut open and removed. The sealing washer is broken and removed, and the worn metal seat, which cannot readily be destroyed, is slid over the sleeve into the axial space in the seal cavity behind the seal. The spare secondary seal and washer are then moved axially to the positions of their destroyed counterparts and the retainer is reassembled around them. The sleeve is pushed back to its old position on the shaft and the spare seat is advanced into the housing in sealing contact with the sealing washer. Finally, the split gland plate is reassembled on the housing. At no time during the removal of the worn seal parts and their replacement is it necessary to remove any portion of the shaft or the drive therefor.

Referring now to the drawings for a detailed description of the invention and particularly to FIG. 1, a housing of a pump or the like is shown at 10, said housing having an opening 11 through which extends a shaft 12 by which a pump impeller or other fluid-moving mechanism (not shown) is driven from the exterior of housing 10. In the form selected to illustrate this invention, housing 10 is provided with a flange 13 and is formed with a recess 14 which, with shaft 12, defines a seal chamber 15.

Surrounding shaft 12 and disposed partly within seal chamber 15 is a sleeve 16 which is sealed with respect to shaft 12 at its left-hand end, as viewed in FIG. 1, by an O-ring 17. At its right-hand end, as viewed in FIG. 1, sleeve 16 has an axial slot 18 and is formed with a split flange 19 extending radially upwardly adjacent slot 18, the ends of the flange being adapted to be drawn together by a suitable bolt 20 or other threaded device to clamp said right-hand end of sleeve 16 to shaft 12 against axial or rotational movement with respect thereto.

Seal chamber 15 is partly closed by a gland plate 21 which is split into two halves in an axial direction so that said plate may be removed from around shaft 12 without freeing the end of said shaft from its motor or other driving device. Said gland plate 21 is fastened by means of bolts 22 to flange 13 of housing 10. It may be understood that the two portions of the split gland plate need not be of equal size, it being only necessary that the smaller part be at least equal in width to the diameter of sleeve 16 so that the large portion can be removed from around said sleeve.

Within seal chamber 15 is disposed a typical seal 23 of the end face type. Said seal 23 may be comprised of a sealing washer 24, a retainer 25, a secondary seal 26, a series of helical springs 27, retained in suitable recesses 28 in retainer 25, and a washer 29 which serves to transmit the spring pressure to secondary seal 26.

Washer 24 is an endless ring of carbon or other frangible material. Secondary seal 26 may be a wedge-shaped endless ring of polytetrafluoroethylene. Spring washer 29 may be an endless metallic washer made of brass or other material compatible with the fluid to be sealed. Retainer 25 is split into two halves in an axial direction, said halves being held together by clamping screws 30. Said retainer 25 is likewise made of either brass or other metal which is compatible with the fluid being sealed. Retainer 25, being split, can also be removed from around shaft 12 without disconnecting said shaft from its drive.

Seal 23 is mounted on a smooth cylindrical surface 31 on the exterior of sleeve 16, said sleeve being of reduced diameter, or stepped from a point just within washer 24 to the flange 19 as shown at 32.

Sealing washer 24 has a radially disposed sealing surface 33 which is in running sealing engagement with a corresponding radially disposed sealing surface 34 on an endless metallic seal seat 35. Said seat 35 is sealed with respect to recess 14 by an O-ring 36. Seal seat 35 is restrained from rotation with washer 24 by a drive pin 37 extending axially thereinto from gland plate 21. The inner diameter 38 of seal seat 35 is greater than the outer diameter of cylindrical surface 31 on sleeve 16.

Gland plate 21 has an axial extension or hub 52 the inner diameter 39 of which is substantially equal to or slightly greater than, the outer diameter of sealing washer 24 and the outer diameter of spring washer 29. A counterbore 40 in hub 52 is of substantially the same diameter as, or slightly greater than, the diameter of recess 14. The axial length of the portion of hub 52 having the inner diameter 39 is substantially equal to the axial length of an assembled sealing washer 24, secondary seal ring 26, and spring washer 29, and the axial length of counterbore 40 is substantially equal to the axial length of seal seat 35 plus a sufficient length to permit the use of a snap ring 41.

Thus a spare spring washer 42, secondary seal 43, sealing washer 44, seal seat 45 and O-ring 46 may be mounted in the gland plate 21 between seal seat 35 and snap ring 41 in counterbore 40. Inasmuch as sleeve 16 is of reduced diameter within gland plate 21, there is no contact between the spare parts, which are non-rotably fixed to gland plate 21, and sleeve 16, which is clamped to, and rotable with, shaft 12, and hence the spare parts will not be worn by sleeve 16.

Assuming now that sealing washer 24, secondary seal 26, and seal seat 35 have become worn to the point that excessive leakage of the fluid in the housing occurs, either at the seal faces 33, 34 or at the secondary seal 26, it becomes necessary to remove the worn seal parts and replace them with new parts. This can be done with the construction shown in FIG. 1 without disassembling the drive shaft 12 by first removing bolts 22 and then removing the split gland plate 21 from around shaft 12. This frees the spare spring washer 42, secondary seal 43, sealing washer 44, seal seat 45 and seal seat O-ring 46.

Next, bolt 20 is loosened to remove the clamping pressure from sleeve 16, and said sleeve is then moved to the right as viewed in FIG. 3 out of seal chamber 15. Seal 23 and its seat 35, together with the old seal seat O-ring 36, are moved outwardly with sleeve 16 as well as the spare parts 42, 43, 44, 45 and 46. Retainer 25 is now accessible from the exterior of housing 10 and the clamping screws 30 are removed so that split retainer 25 may be removed from around sleeve 16. This also makes sealing washer 25, secondary seal 26, and spring washer 29 accessible. These elements are then broken up or cut so that they may be removed completely from around sleeve 16. It is now possible for old seat 35, which cannot be readily destroyed nor moved past flange 19, and its O-ring 36, to be moved to the left as viewed in FIG. 3 into a space at the bottom of recess 14 between the inner end of sleeve 16 and the bottom of said recess 14. O-ring 36 helps hold ring 45 frictionally in place at the bottom of recess 14.

With seal seat 35 located at the bottom or recess 14 as shown in dotted outline in FIG. 3 the replacement seal parts may now be installed on sleeve 16.

The spare parts 42, 43, and 44 are moved back around surface 31 to the positions occupied by their corresponding parts 29, 26, 24 when the latter were first installed as new seal parts, and split retainer 25 is reassembled around the new parts and clamped into place upon surface 31. Seal seat 45 is at this point loose on sleeve 16, just as the original seal seat 35 was loose around sleeve 16 at this stage of the assembly of the seal on sleeve 16. Said sleeve 16 is then slid to the left as viewed in FIG. 3 into recess 44 to its previous position on shaft 12 and gland plate 21 is then bolted to flange 13 between seat 45 and sleeve flange 19, the gland plate, as in the original installation causing the new seat 45 to bear against sealing washer 44 and the pressure of the springs 27 to assure firm running sealing contact between the radial face 47 on washer 44 and the radial face 48 on seal seat 45. The sealing arrangement now resembles that shown in FIG. 4.

It may be noted that the presence of the old seal seat in the bottom of seal chamber 15 does not interfere in any way with the operation of the seal. It may be noted further that the entire change of worn parts for the new parts previously stored in gland plate 21 was effected without in any way requiring the threading of any part over the end of shaft 12. Thus it was not necessary to disconnect the shaft from its drive to replace the worn parts with new parts.

In the embodiment just described the spare parts were retained in the gland plate and hence did not rotate. In the modification shown in FIG. 6 the spare parts are retained in a cup-shaped molded foam plastic member 49 which fits closely over the spare parts and over the sleeve 50. Said sleeve 50 is of constant diameter throughout its length to provide support for the spare parts 42–45. In the FIG. 6 form, the gland plate 51 is likewise split, but it contains no axial extension since it is not required to provide a chamber for holding the spare parts. The plastic retainer 49 is expendable in the sense that it may be readily cut and ripped away from the spare parts when it is desired to use them to replace the worn parts within seal chamber 15. In all other respects the method of removing the worn parts and replacing them with the new parts is the same as that used with the FIG. 1 form so that the ultimate result resembles that of FIG. 4.

The foregoing invention is applicable to seals of the end face type using various forms of expendable parts. Thus the secondary seal may be an O-ring, or a V-ring, or any of the known forms of packing rings capable of functioning in the environment and physical conditions found in cavity 15. In some instances seat ring 45 may be made of ceramic and hence can, if desired, be broken up and removed rather than stored at the bottom cavity 15. It is also contemplated that extension 52 on gland plate 21 may be a separate piece made of foam rubber and simply adhered to a flat gland plate such as 51 in FIG. 6.

It is understood, thus, that the foregoing description is merely illustrative of preferred embodiments of the invention and that the scope of the invention therefore is not to be limited thereto, but is to be determined by the appended claims.

I claim:

1. The combination with relatively rotatable elements comprising a housing and a shaft passing through said housing, said housing having a seal cavity around said shaft, of seal means in the cavity in sealing relation to the housing and shaft, said seal means having an expendable part, a duplicate expendable part disposed around the shaft in axially spaced relation to said seal means, means on one of said elements supporting said duplicate part in fixed relation to said one of said elements, a split abutment between said seal means and duplicate part, said abutment being removable radially of said shaft, whereby to make the expendable part of the seal means accessible for removal and replacement by said duplicate expendable part, a sleeve on said shaft slidable axially thereon, means for sealing said sleeve with respect to said shaft and means for securing the sleeve to the shaft for rotation therewith, said seal means being mounted on said sleeve and said sleeve passing through said duplicate expendable part.

2. The combination described in claim 1, said expendable part comprising a frangible sealing washer, and said seal means having an expendable removable secondary seal and an expendable rigid washer, said cavity being longer than said sealing means, and said expendable rigid washer being movable into said cavity beyond said sealing means when the secondary seal and frangible sealing washer are expended.

3. The combination described in claim 2, said seal means comprising a split retainer, axially directed spring means in the retainer adapted to exert axial pressure upon the secondary seal, and means for driving the retainer from the shaft.

4. The combination described in claim 1, said expendable part comprising a frangible sealing washer and said seal means having an expendable removable secondary seal and an expendable metal seal seat adapted to have running sealing engagement with said frangible sealing washer, means for fixing said metal seat against relative rotation with said housing, said abutment comprising a split gland plate, an axially slidable sleeve on said shaft, means for fixing said sleeve to said shaft, said seal means comprising further a split retainer adapted to be fixed to said sleeve, said frangible washer and secondary seal being disposed within said retainer, and there being a duplicate metal seal seat and a duplicate secondary seal disposed around said shaft in axially spaced relation to said seal means.

* * * * *

PO-1050
(5/69)

UNITED STATES PATENT OFFICE
CERTIFICATE OF CORRECTION

Patent No. 3,675,933  Dated July 11, 1972

Inventor(s) William D. Nappe

It is certified that error appears in the above-identified patent and that said Letters Patent are hereby corrected as shown below:

In Title (P. 1) Change "SPACE" to --SPARE--.

In Abstract - line 7 before "seal" change "he" to --the--.

Col. 1 in Title, change "SPACE" to --SPARE--.

Signed and sealed this 26th day of December 1972.

(SEAL)
Attest:

EDWARD M. FLETCHER, JR.
Attesting Officer

ROBERT GOTTSCHALK
Commissioner of Patents